Nov. 2, 1937.  J. F. DONOVAN ET AL  2,098,030
MACHINE FOR MANUFACTURING INCANDESCENT LAMPS
Filed June 30, 1934   7 Sheets-Sheet 1

Inventors:
John F. Donovan,
George Illingworth,
by Harry E. Dunham
Their Attorney.

Nov. 2, 1937.  J. F. DONOVAN ET AL  2,098,030
MACHINE FOR MANUFACTURING INCANDESCENT LAMPS
Filed June 30, 1934  7 Sheets-Sheet 4

Inventors:
John F. Donovan,
George Illingworth,
by Harry E. Dunham
Their Attorney.

Inventors:
John F. Donovan,
George Illingworth,
by Harry E. Dunham
Their Attorney.

Patented Nov. 2, 1937

2,098,030

UNITED STATES PATENT OFFICE 2,098,030

MACHINE FOR MANUFACTURING INCANDESCENT LAMPS

John F. Donovan and George Illingworth, East Cleveland, Ohio, assignors to General Electric Company, a corporation of New York Application June 30, 1934, Serial No. 733,157

16 Claims. (Cl. 176—3)

Our invention relates to the manufacture of electric lamps and more particularly to machines for manufacturing miniature lamps of the type comprising a mount consisting of two juxtaposed lead wires held together by an insulating body and supporting a short filament to which these leads supply current. Because of their small size, the manufacture of parts for such lamps has been particularly difficult. Various operations have been performed manually because machines for doing these operations have not existed and this has added to the difficulty. One of these operations is the feeding of the miniature lamp mounts into a sealing machine and another operation is the placing and positioning of the mount in the bulb. Still another operation is the transfer of the bulb assembly from the sealing machine to the exhausting machine and its insertion into said machine.

The principal object of our invention is to provide a single machine for manufacturing miniature lamp mounts, for sealing said mounts in a bulb, and for exhausting and tipping off said lamps, combined with appropriate transfer and feed mechanisms. A feature of our invention is the storage means which receives the mounts from the machine in which they are made and the mechanism by which they are automatically fed to the sealing machine. Another object of our invention is to provide mechanism for placing the mount so that after sealing the filament is properly located in the bulb. Other objects and features of the machine of our invention will appear from the detailed description of species which follows and from the accompanying drawings.

Figures 1, 25, 26, 27, 28:
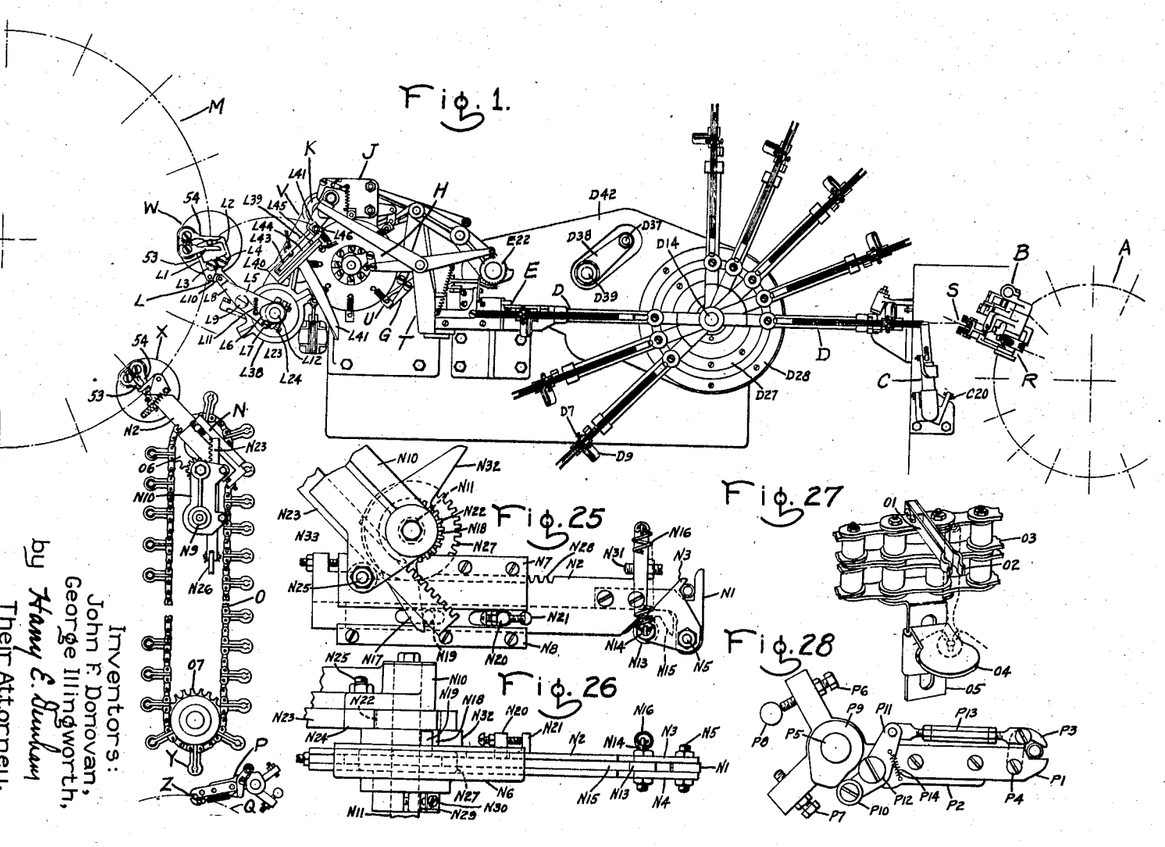
Fig. 1 is a plan view of the machine of our invention.
Figs. 25 and 26 are top and side views of the sealing machine unloading mechanism.
Fig. 27 is a perspective view of a portion of the lamp conveyor chain and Fig. 28 is a plan view of the exhaust machine loading mechanism.
Figures 2, 5:
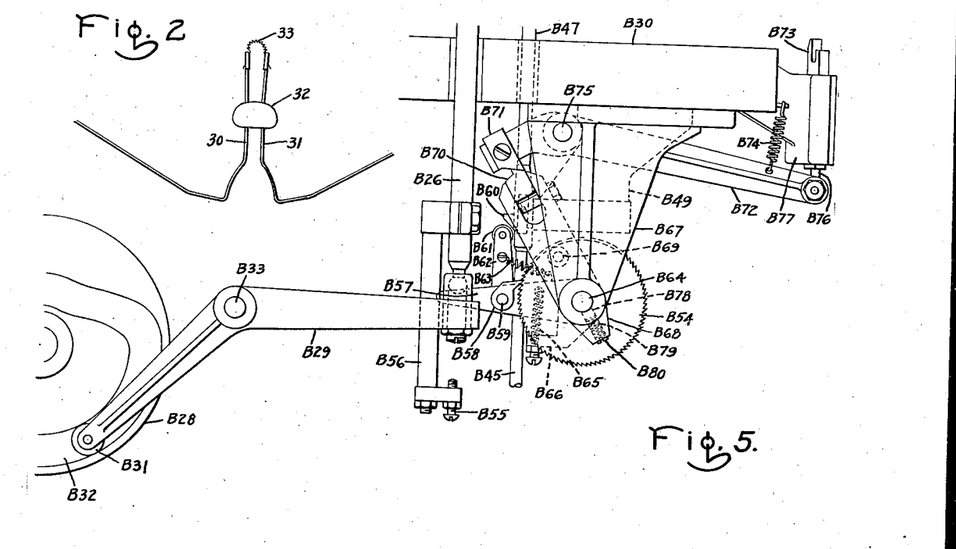
Fig. 2 is a side elevation of a mount produced by our machine.
Figs. 5 and 6 are side and end views of the operating mechanism therefor and associated mount counting mechanism.

The series of operations of the machine comprising our invention as shown in Fig. 1, begins with the mount manufacturing machine A which manufactures lamp mounts of the type shown in Fig. 2. The machine is of the type disclosed in U. S. Patent 1,733,881 issued October 29, 1929 to Illingworth, which is a turret type machine having heads at the positions indicated. The turret turns in a counterclockwise direction and the mount is completely manufactured as it enters position R. The mount is taken from this position by the turret unloading mechanism B and transferred to position S. During the transfer an electric current is passed through the leading-in wires and filament and, should insufficient energy pass, the unloading mechanism will stop at an intermediate point and discard the mount. The chute loading mechanism C takes the mounts at position S from the turret unloading mechanism and transfers them to the storage chute D which is located opposite position S. There are in this instance eight of the chutes D which pivot about a centrally located point and tilt down in the direction of said point. The mounts placed thereon slide down toward the inner end and are counted by a mechanism operating with the turret unloading mechanism. After a definite number of mounts have been placed on the chute it swings 180° to the unloading position or against other chutes ahead of this position whereupon it is subsequently advanced into said position. The stationary chute E is located at the unloading position and the storage chute is tilted in the opposite direction thereat so the mounts slide down onto the stationary chute. Storage for a number of mounts is furnished by the chute and means are provided for releasing the storage chute so that another may take its place when the number of mounts thereon is considerably reduced. The mounts are released to the end T of the chute by a mount escapement mechanism F (not shown in Fig. 1) which releases them one at a time.

From the lower end T of the stationary chute the mounts are taken by the mount transfer mechanism G to jaws of the mount turret H at position U. The escapement mechanism operates in conjunction with the beads of the mounts which lie in one plane and are not entangled. The mount turret indexes intermittently and carries the jaws into the unloading position V. Here it is placed in a bulb fed into the machine through the bulb escapement mechanism J and bulb turret K. The bulbs are fed into the turret by the escapement mechanism and are transferred to position V by rotation of the turret. The bulb transfer mechanism L then grips the bulb and lifts it to a position adjacent a jaw in the turret H which releases said mount whereupon the bulb is transferred by mechanism L to a head W in the sealing machine M.

The sealing machine M is of the type disclosed in Patent 1,742,153 issued December 31, 1929 to Stiles et al. and butt seals a tube to the bulb with the lead wires of the mount sealed in the joint thus formed. The machine turns in a counter-clockwise direction and all operations are completed as the bulb assembly indexes into position X. The bulb assembly is unloaded here by the transfer mechanism N which places said assembly on the conveyor chain O. Intermittent indexing of the chain carries the assembly into position Y from which it is taken by the transfer mechanism P and placed in the head of an exhaust machine Q at position Z. The exhaust machine corresponds to that portion of the machine shown in Patent 1,736,766 issued November 19, 1929 to Burrows for exhausting, although the machine heads are inverted. The products from this machine are glass enclosures having a filament therein, either exhausted or gas-filled and having leading-in wires extending therefrom.

In detail, the machine of our invention consists of the mount making machine A indicated in Fig. 1, preferably of the type shown in the U. S. Patent 1,733,881 hereinbefore referred to, which manufactures miniature lamp mounts of the type shown in Fig. 2. Such mounts preferably comprise a pair of leading-in wires 30 and 31, juxtaposed portions of which are held together by a bead 32 of insulating material such as glass and which support a filament 33 at their inner ends. The outer ends of the leading-in wires extend transversely to the inner ends and are each preferably bent back so as to be at an angle of approximately 70° to the midportion and extending in opposite directions therefrom. The mount is complete as said machine indexes the head in which it rests into position R, the midportions of the leading-in wires being disposed vertically on either side of the jaw 34 (Fig. 3) and clamped thereto by jaws 35 and 36, the filament 33 being uppermost.

Figure 3:
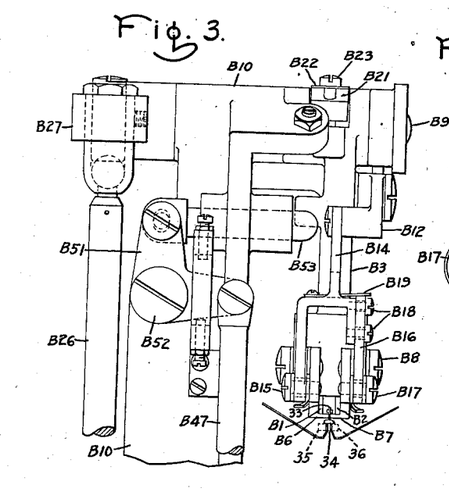
Figs. 3 and 4 are side and end views of the mount machine unloading mechanism.
Figure 4:
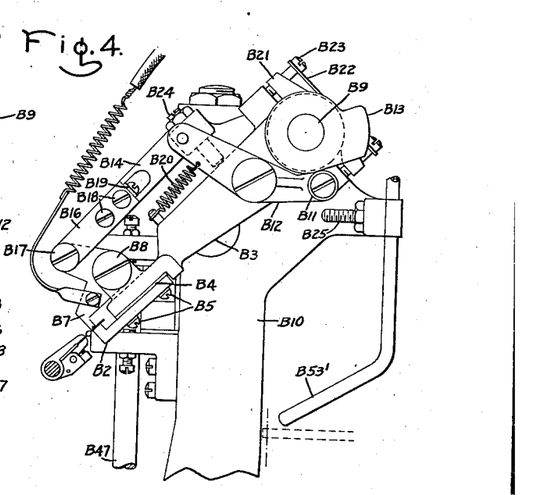

The mount is taken from the turret jaws by the unloading mechanism B shown in Figs. 3 and 4. The mechanism comprises a pair of fixed jaws B1 and B2 mounted separately on arm B3 and insulated therefrom by the sheet B4 of insulation and by insulating bushings (not shown) about screws B5. As the mount making machine turret indexes the mount into position R, jaws B1 and B2 lie to one side of the path of travel and the movable jaws B6 and B7 lie to the other side. The movable jaws are mounted on insulated bushings of screws B8 which screw into arm B3 and close on the mount after the outer jaws 35 and 36 of the machine turret have been released. The unloading jaws are closed by a clockwise turning of shaft B9 which rides in standard B10 and supports arm B3. The first turning of shaft B9 results in roller B11 of lever B12 falling to a low part of cam B13 on said shaft and causes lever B12 to actuate the jaws through yoke B14. Connection to jaw B6 is made through an insulating bushing on screw B15 and to jaw B7 through arm B16 and a similar bushing and screw B17. The arm B16 is attached to the yoke B14 by screws B18 which lie in slots in said arm and is kept forward as far as possible by a spring B19 which causes both the jaws to bear equally against the mount. The jaws are closed by spring B20 which extends between lever B12 and a post in arm B3 and keeps roller B11 against cam B13. Having gripped the mount the jaws swing into the position shown in Fig. 4 as the friction produced by bearing cap B21, which is located below leaf spring B22 extending between screws B23 of arm B3, causes arm B3 to move with the rotating shaft B9. On reaching the position shown in Fig. 4 further rotation of the arm is prevented by it striking stop screw B24 in the standard, whereupon the high part of cam B13 is carried below roller B11 and the jaws are opened. A similar stop screw B25 is located at the other position of the arm. Rotation of shaft B9 results from vertical movement of rod B26 which operates through arm B27 and is operated as shown in Fig. 5 by cam B28 through lever B29. The cam is located on a cam shaft of the mount making machine below the table B30 on which the standard B10 is mounted and operates lever B29 through engagement of roller B31 thereof riding in its ways B32. Lever B29 pivots about pin B33.

Figures 6, 7, 8, 9:
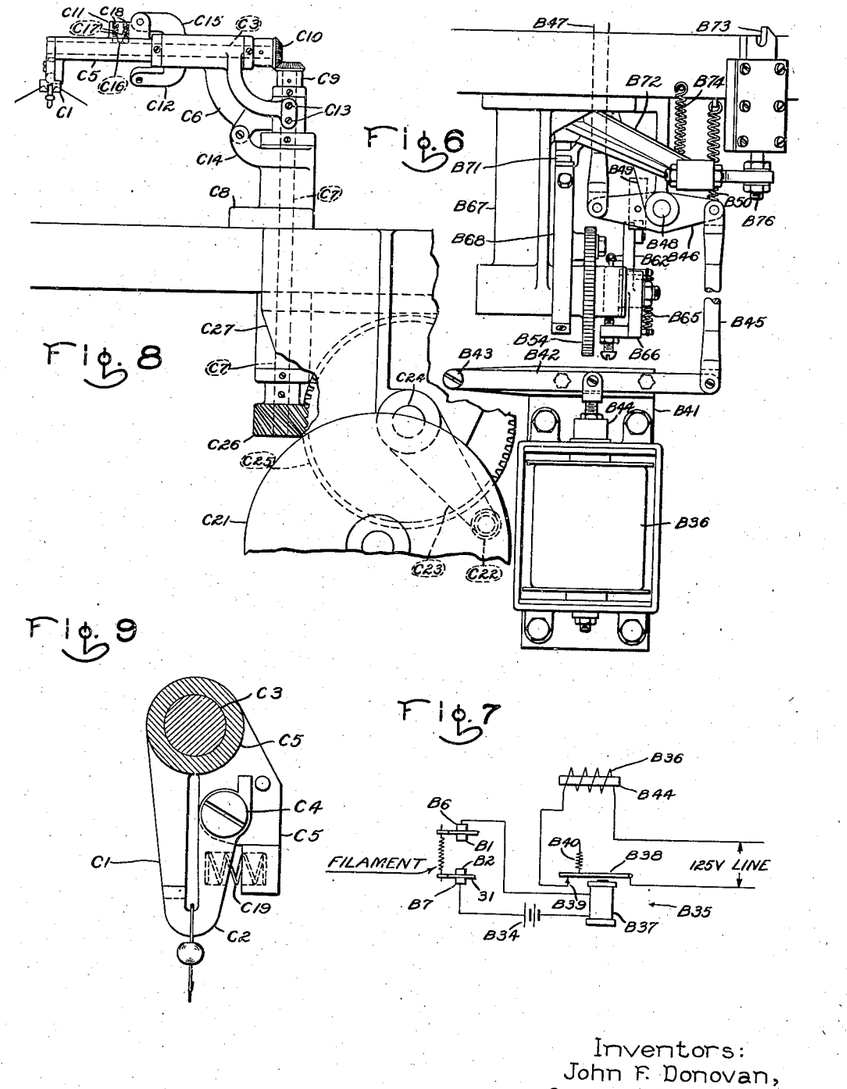
Fig. 7 is the wiring diagram of the mount testing circuit of the unloading mechanism.
Fig. 8 is a side view of the storage chute loading mechanism.
Fig. 9 is a side view of the jaws thereof at right angles to the former and on an enlarged scale.

In connection with the unloading mechanism means are provided for testing the mount by passing a current therethrough. As shown diagrammatically in Fig. 7 and in Figs. 3 and 4, electrical energy from a battery B34 is connected so as to pass from one movable jaw, through the leading-in wire in contact therewith, the filament and through the opposite leading-in wire to the other movable jaw. A relay B35 also located in this circuit causes a circuit of greater voltage through solenoid B36 to be closed if sufficient current can be passed through the mount. The current in the coil B37 of the relay causes the armature B38 to be pulled into contact with contact B39 against the pull of spring B40. The solenoid B36 as shown in Fig. 6 is mounted on bracket B41 extending from the frame of the machine (not shown) and operates lever B42 which pivots about screw B43, by means of the armature B44 which is attached to a midpoint thereof. Movement of lever B42 operates rod B45 which turns lever B46 causing movement of rod B47. Lever B46 turns about pin B48 in a bracket B49 extending from the bottom of the table and operates against the pull of spring B50 which extends between a post in the table and one in said lever. As shown in Fig. 3 rod B47 is attached to lever B51 which pivots about screw B52 in the standard and during operation of the solenoid B36 pulls stop rod B53 in, out of the path of movement of arm B3. Should no current be passed through the mount due to a faulty mount, no current will pass through the solenoid and the arm B3 will be arrested by stop rod B53 resulting in the dumping of the mount at this position. The defective mounts not taken by the unloading mechanism are blown from the turret by air from pipe B53'.

Too many mounts must not be placed on each storage chute and therefore the good mounts carried by the unloading mechanism are counted or recorded. This mechanism is shown in Figs. 5 and 6 and consists of a ratchet wheel B54 which has a number of teeth equal to the number of mounts fed onto one chute. The mechanism is operated as rod B26 moves upward since screw B55 in the bracket B56 clamped thereto moves arm B57 upward. During the movement pawl B58 on pin B59 in arm B57 advances the ratchet wheel B54 one notch providing the mount being transferred is acceptable, but if the mount is defective, the cam B60 stays in position and holds the pawl away from the wheel. This action results as roller B61 of arm B62 then rides on cam B60 and, since both arm B62 and the pawl are fastened to pin B59, spring B63 cannot pull the pawl against the ratchet wheel. Arm B57 is slidably mounted on shaft B64 and is returned to its former position by spring B65 which extends between a post in said arm and a post in a bracket B66 attached fixedly to shaft B64. Shaft B64 is fixedly mounted in support bracket B67 and carries arm B68 which is made to move with the ratchet wheel due to the bolt B69 therebetween. With the completion of a revolution of the ratchet wheel, block B70 is carried below cam B71 in lever B72, turning the lever and thereby pulling stop slide B73 down permitting another chute to be indexed into position as later explained. Immediate return of lever B72 to the up position is produced by spring B74 which extends between a post in the table and said lever. The lever B72 turns about a pin B75 in bracket B67 and is connected to slide B73 which rides in ways in bracket B77 by stud B76. Arm B68 does not move free about shaft B64 but carries a friction producing pad B78 which is backed up with a spring B79 and screw B80 so the weight of said arm does not pull the ratchet wheel around.

The mounts are taken from the unloading mechanism by the storage chute loading mechanism C shown in Figs. 8 and 9. This mechanism consists of two jaws C1 and C2 which grip the mount as shown. The jaw C1 is mounted on shaft C3 and the jaw C2 is mounted through screw C4 on sleeve C5. Shaft C3 is mounted in bracket C6 which is supported by shaft C7 which passes vertically through standard C8. When the turret unloading mechanism swings the mount into position the jaws of the chute loading mechanism are open and the mount is placed between them. Shaft C3 is then rotated counter-clockwise about its axis due to an opposite rotation in shaft C7 which is geared thereto by gears C9 and C10 causing jaw C1 to close on the mount. Jaw C2 does not turn as sleeve C5 on which it is mounted has a protuberance C11 which lies against the stop screw in arm C12 of bracket C6. A counter-clockwise rotation then occurs in shaft C7 causing bracket C6 to swing over the storage chute being loaded since friction is produced between the bracket and shaft by blocks and springs (not shown) below each of the screws C13. The bracket is properly located when it strikes the stop screw in arm C14 of the standard C8 whereupon further turning of shaft C7 turns shaft C3.

During the turning of shaft C3 both jaws are swung down to the position shown in Figs. 8 and 9 whereupon protuberance C11 strikes the stop screw in arm C15 of bracket C6 causing the jaws to open. Both jaws move together while turning since friction is provided between sleeve C5 and shaft C3 by the slugs C16 located below springs C17 and screws C18. The mount is securely held by the jaws during the turning as spring C19 which is located between and in apertures of jaw C2 and sleeve C5 keeps them together. The released mount drops onto the storage chute and the mechanism is returned to the former position by a clockwise turning of shaft C7. In returning, the bracket C6 is swung until it strikes stop screw in arm C20 (Fig. 1) of standard C8 whereupon the jaws turn into position and are closed after a mount has been placed therebetween. Shaft C7 is operated from cam C21 which is located on a cam shaft of the mount making machine and which is engaged by roller C22 at the end of arm C23 on shaft C24. This shaft operates shaft C7 through gears C25 and C26 and turns in bracket C27 by which it is supported.

Figure 10:
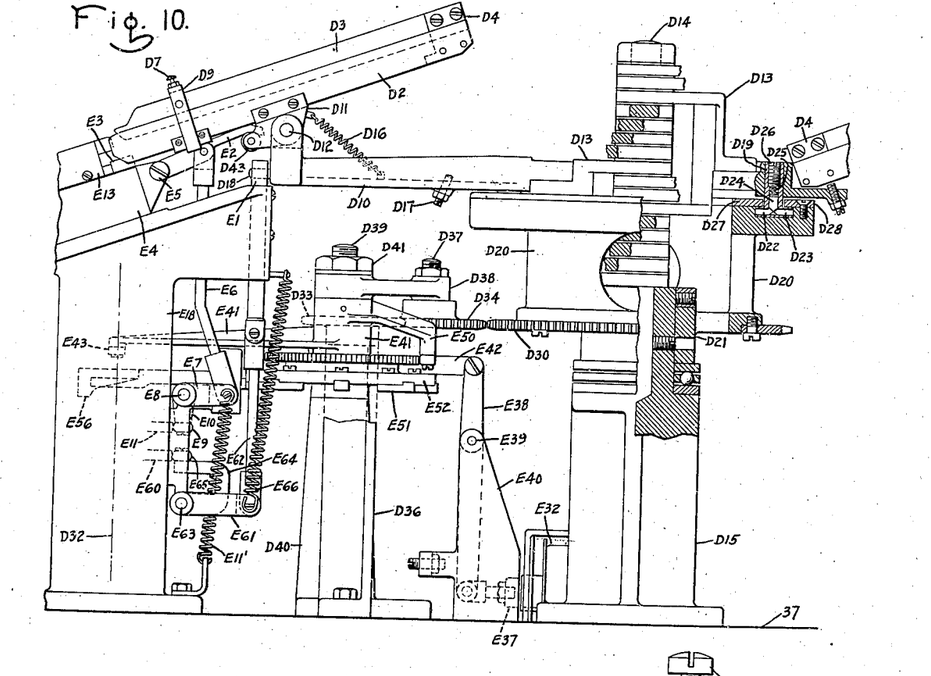
Fig. 10 is a side elevation of the mount storage chutes.
Figures 11, 14:
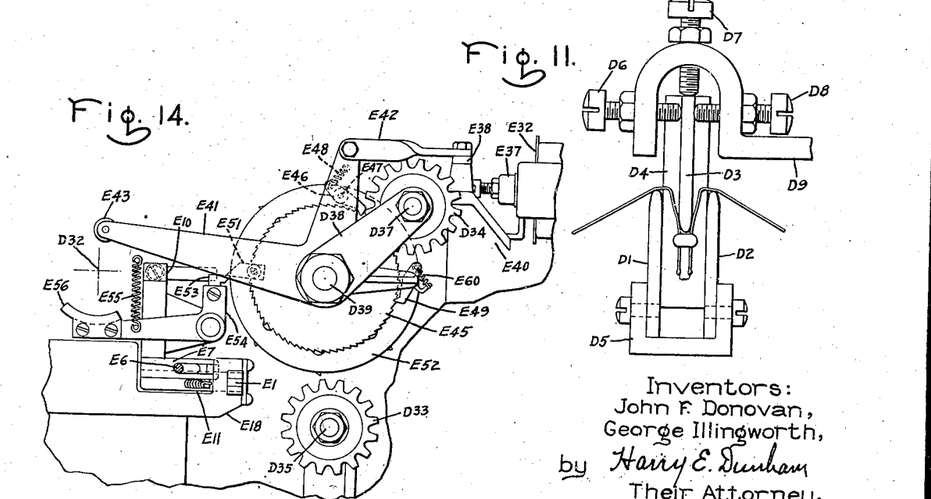
Fig. 11 is an end view of one of said chutes on an enlarged scale.
Fig. 14 is a plan view of the mount chute indexing mechanism.

The mount dropped from the chute loading mechanism C falls onto the rails of a storage chute D located in juxtaposition with this mechanism. As shown in Figs. 1, 10 and 11, there are eight of these chutes each of which consists of side rails D1 and D2 and guide rail D3. The rails are fastened together at the back end by block D4 and the forward end of rails D1 and D2 are fastened together by yoke D5 as shown in Fig. 11. The guide rail D3 is held in position by screws D6, D7, D8 which extend from the bracket D9 attached to said yoke. The chutes are each supported by an arm D10 to which they are attached by means of block D11 and pin D12, the arm D10 being attached in turn to yoke D13. The arms of the yokes are each slidably mounted on the fixed vertical shaft D14 extending from standard D15 and are so arranged as to support each chute on the same plane as the others without interfering with the free turning of the chute ahead of it in a clockwise direction. The standard D15 rests on a table 37 only partially shown located between machines. A spring D16 is provided between a post in block D11 and another post in arm D10 so that the chutes will normally tilt toward their closed end. In this loading position the inner end of the chute rests against stop screw D17 in the arm D10 and the tilt thereof causes the mounts placed thereon to slide down against the block D4.

As shown in Fig. 1, four storage chutes are lined up behind the chute into which the mount is being fed since said chutes swing about shaft D14 in a clockwise direction. Each chute is constantly under a clockwise turning force and is held from revolving either by the preceding chute or, when before the loading mechanism, by the stop slide B73 (Fig. 5) of the counting mechanism previously referred to which engages stud D18 extending from arm D10. The rotating force is provided by frictional engagement of stud D19 with wheel D20 which turns about the hub D21 of standard D15 and which provides a circular track in which the head of said stud is located. Friction is produced by two oppositely disposed slugs D22 and D23 in a transverse hole in the head of stud D19 located in the track which are pressed outward against the sides of said track by the wedge D24 located below spring D25 and screw D26 in the shank of said stud. A portion of the ways is closed off by rings D27 and D28 so the head of the stud may not slip out. Wheel D20 is turned by a chain D29 partially shown in Fig. 15 which engages sprocket D30 of said wheel and which is driven by sprocket D31 on cam shaft 38 indicated by center line D32 in Figs. 10 and 14. The chain also passes around idler sprockets D33 and D34, the former of which turns about stud D35 in standard D36 and the latter of which turns about stud D37 on arm D38. The chain is tightened by turning arm D38 about post D39 which is supported by standard D40 and then clamping said arm in place by tightening nut D41. Guard D42 (Fig. 1) covers the chain drive. After the desired number of mounts have been counted onto the chute and it has been released as previously described, it swings around 180° to the unloading position.

In most cases the chute does not enter the unloading position directly but swings against preceding chutes which rest against the particular chute being unloaded. In Fig. 1 two chutes are shown behind the chute being unloaded. The unloading chute is tilted down at its outer end so the mounts will slide therefrom and is held in position by stop slide E1 which engages stud D18. The tilting is produced by finger E2 which engages roller D43 on a pin in block D11 pulling the forward end of the chute down so the outer rails D1 and D2 thereof straddle vane E3 of block E4. Finger E2 is pivoted about screw E5 in block E4 by rod E6 which is attached to arm E7 (Fig. 14) on shaft E8 and moves down when roller E9 of arm E10 also on said shaft comes over a low part of cam E11 (Fig. 10). Spring E11' which extends between a post in arm E7 and a fixed fastening causes the roller E9 to follow the cam.

Figures 12, 13:
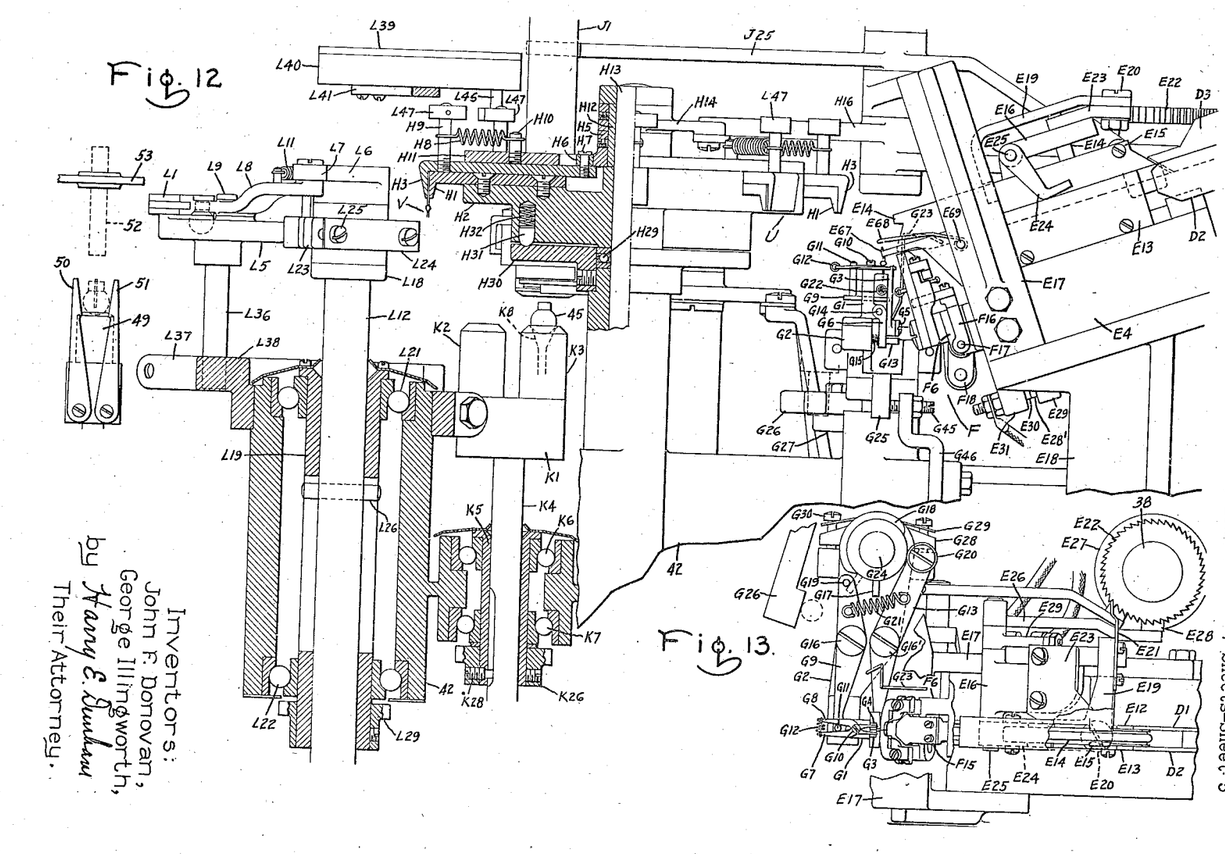
Fig. 12 is a side elevation of the stationary mount chute, mount escapement mechanism, mount transfer mechanism, mount turret, bulb feed and transfer mechanism.
Fig. 13 is a plan view of the stationary mount chute, mount escapement and mount transfer mechanism.

The mounts passing off the storage chute as shown in Figs. 12 and 13, slide onto rails E12 and E13 of the stationary chute E and pass down the ways thereof until they strike the jaws of the escapement mechanism F. A guide rail E14 is also provided which is loosely mounted on screw E15 of bracket E16 and on another screw (not shown) extending from bracket E17. Both brackets are attached to block E4 which is mounted on standard E18 which is in turn mounted on table 37. Since some means of agitation is required to keep the mounts always sliding down the chute the guide rail E14 is agitated by lever E19. The rail fits loosely in a slot in the end of lever E19 which pivots about screw E20 and is vibrated by finger E21 (Fig. 13) mounted thereon passing over the teeth of ratchet E22 on cam shaft 38. Screw E20 is supported by arm E23 fastened to bracket E16.

Figure 17:
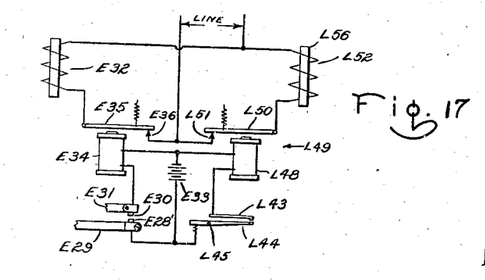
Fig. 17 is a wiring diagram of the indexing control mechanism and of the bulb feed indexing control mechanism.

In passing down the stationary chute the mounts pass under both arms of feeler E24 which is fastened to shaft E25 in bracket E16 and which is turned at intervals so as to rest on edges of the rails or the mounts thereon. This motion is produced by arm E26 (Figs. 12, 13, and 15) which is fastened to shaft E25 and engages cam E27 through roller E28. The purpose of the feeler is to give warning of the small supply of the mounts still left on the stationary chute so that the empty storage chute may be released and a loaded chute allowed to index into the unloading position. The warning is transmitted when the contact E28' on arm E29 on shaft E25 strikes contact E30 on arm E31 and as shown in Fig. 17, results in the operation of solenoid E32. Arm E31 is attached to standard E18. The circuit in which the contacts are connected consists of a battery E33 and the coil E34 of a relay which closes a circuit of greater voltage through the solenoid E32 when armature E35 makes contact with contact E36. The solenoid E32, as shown in Figs. 10 and 14, operates through its armature E37 which turns lever E38 about pin E39 in bracket E40 thereby turning counter-clockwise the lever E41 to which it is connected by link E42. The action places roller E43 on the other arm of lever E41 against the low part of cam E44 (Fig. 15) so that it is moved clockwise when the high part of the cam comes below the roller. The resultant action is that ratchet wheel E45 (Fig. 14) is turned one tooth since it is engaged by pawl E46. The pawl E46 is pivoted on a pin E47 in lever E41 and is kept in engagement with the ratchet by spring E48 extending between a post in the pawl and another post in lever E41. Pawl E49 prevents the ratchet wheel E45 from turning counter-clockwise since it is pivotally attached to arm E50 which is attached to stationary post D39. Spring E60 which is stretched between a post in said pawl and another post in the arm keeps said pawl against the ratchet wheel. In this particular instance operation of the solenoid once does not effect the release of the storage chute but after six operations thereof, the release is effected. The purpose of this lag is to give time after the release for another chute to come into position for tilting the chutes and to permit the mounts to slide down under the feeler.

The chute tilting and release mechanism are placed in operation by the cam blocks E51 on wheel E52 which is attached to the ratchet wheel. The blocks engage dog E53 which causes lever E54 to turn counter-clockwise. The motion stretches spring E55 which is located between posts in lever E54 and standard E18 and swings the cam segment E56 away from the roller E57 (Figs. 15 and 16) of cam E11. This action causes cam E11 to turn as the key E58 on which roller E57 is attached is then pushed upward engaging a depression in collar E59 which is attached to cam shaft 38. A high part of the cam comes under roller E9 causing mechanism previously described to permit the storage chute to tilt back. The release of the chute is brought about by cam E60 (Figs. 10 and 16) which is fastened to cam E11 and results in the lowering of stop slide E1. The slide operates in ways in standard E18 and is operated by lever E61 to which it is connected by link rod E62. Lever E61 is fastened to a shaft E63 which is turned by arm E64 which in turn is operated by a roller E65 carried thereby which engages cam E60. The roller is made to follow the cam by spring E66 which extends between a post in lever E61 and another post in the standard E18. Since the highest part of cam E60 moves out from under roller E65 before another chute comes into position it will be stopped by the stop slide and after it has come into position a still lower part of the cam comes below the roller so that the stop slide is raised farther thereby locking stud D18 of the chute.

The mount escapement mechanism as shown in Figs. 12, 13, 18 and 19 consists of two pairs of jaws which at intervals separate and release one of the mounts coming down the stationary chute so that it may slide to the end thereof. The bead 32 of the first mount passing down the chute enters into an aperture F1 formed by jaw F2 and by jaw F3 which are mounted on screw F4 and F5, respectively, extending from bracket F6. The bead 32 of the following mounts rest against the pocketed bead until the fingers F and F8 of jaws F9 and F10, respectively, are drawn together, thereby separating the remaining mounts from the lowermost one and preventing further advancement of said mounts. Following this motion jaws F2 and F3 are opened permitting the mount of the bead which was pocketed to slide on down the chute. Jaws F9 and F10 are mounted on screws F4 and F5, respectively, and the fingers F7 and F8 thereof are each pivotally mounted on screws F11 in the jaws and each is kept against the adjacent jaw by a spring F12 which is located between and in apertures in the respective jaw and fingers. The hinged feature of the fingers takes care of the variations in bead sizes too large to be held by the aperture or pocket F1. Jaws F2 and F3 are closed by spring F13 and jaws F9 and F10 are closed by spring F14 each of which extends between posts in the respective pairs of jaws. The jaws are opened by cam F15 which is mounted on arm F16 (Fig. 12) and which is oscillated back and forth between the jaws. Arm F16 is attached to shaft F17 which is mounted in bracket F6 and is turned by arm F18 fastened thereto. Bracket F6 is mounted on block E4. As most clearly shown in Fig. 15, arm F18 is operated from cam E27 on cam shaft 38 which operates arm F20 on pin F21 which in turn operates through arm F22 and pin F23 on arm F18. Arm F20 engages the cam through roller F24 and pin F21 is mounted in bracket E17.

The mount released by the escapement mechanism slides down the rails E12, E13 (Fig. 12) to the end where it is caught by the up-turned ends E67 thereof. A gate E68 extending from pins E69 in bracket E17 prevents the mount from passing over the chute ends. The mount transfer mechanism G then swings into the position shown in Figs. 12 and 13 and grips the leading-in wires of a mount just below the bead. The transfer mechanism consists of a stationary jaw G1 mounted on arm G2 and movable jaws G3 and G4 which are pivoted on similar screws G5 in bracket G6. As the jaws are swung into position the movable jaws are spread apart and are away from the stationary jaw. The spreading is brought about by levers G7 and G8 and by the wedge end of lever G9 located between said jaws. The levers G7 and G8 pivot on screw G10 of the stationary jaw and engage protuberances extending from the movable jaws. The stud G11 extending from lever G9 wedges levers G7 and G8 apart causing spring G12 stretched between the end thereof to expand. The movable jaws are pulled away from the stationary jaw by lever G13 which turns bracket G6 about pin G14 against the pressure of spring G15. Levers G9 and G13 are pivoted on screws G16 and G16', respectively, extending from arm G2 and in this position are in engagement with the pin G17 and the high part of cam G18, respectively. A pin G19 of lever G9 engages pin G17 of the cam whereas a roller G20 of lever G13 engages the cam and both are kept in engagement with said cam by spring G21 stretched between posts in both levers. A counter-clockwise motion occurring in the cam first brings the movable jaws together since pin G17 moves away from pin G19 and then causes the jaws to grip the mount. The movable jaws are drawn together by spring G22 which extends between a post in each jaw.

Figures 15, 16:
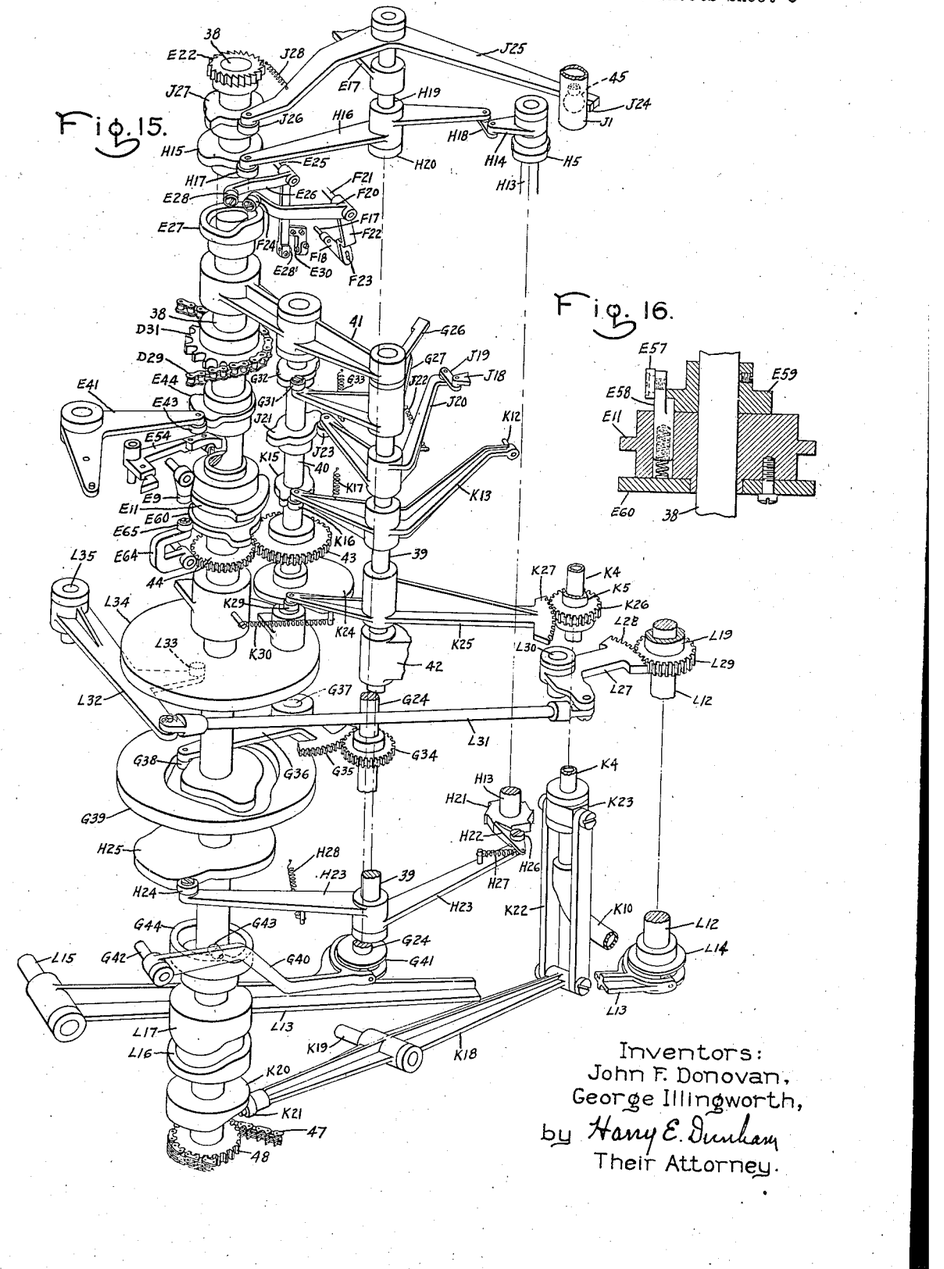
Fig. 15 is a diagrammatic perspective view of the cam shafts and associated operating mechanism.
Fig. 16 is a section through the storage chute indexing control clutch.

The mount transfer mechanism raises the gate E68 when turning into the position shown by bringing wire G23 below one of the support wires thereof. The transferring movement is preceded by a rising movement which brings the mount above the turned-up ends E67 of the chute. A clockwise turning now occurs in shaft G24 on which both cam G18 and arm G2 are mounted, thereby causing the transfer jaws to swing to a position below the jaws of the turret H at position U. In this position stud G25 of arm G2 lies against stop arm G26 of lever G27 (Figs. 12, 13, and 15). The mechanism then rises until the mount is between the turret jaws whereupon the mount is gripped by the turret jaws and further rotation of shaft G24 occurs, causing the separate rotation of cam G18 and the opening and spreading of the jaws as described. The arm G2 moves with shaft G24 since a friction bearing cap G28 is pressed thereagainst by the leaf spring G29 extending between screws G30.

Having transferred the mount to the turret, the transfer mechanism is allowed to swing under the turret so as to clear the mount as the turret indexes. This operation is caused by turning of shaft G24 and by movement of the stop arm G26. Lever G27 on which arm G26 is mounted turns about shaft 39 (Fig. 15) since the roller G31 thereof engages cam G32 on cam shaft 40. Spring G33 attached to said lever and a stationary part of the machine causes the roller G31 to follow the contour of the cam. Shafts 39 and 40 are supported by bracket 41 extending from cam shaft 38 and by bracket 42 only partially shown which is mounted on the table of this portion of the machine. Shaft 40 is driven by gear 43 which meshes with gear 44 on cam shaft 38. The vertical shaft G24 is also mounted in bracket 42 and is rotated by gear G34 which meshes with the gear segment G35 of lever G36. The lever G36 pivots about a pin G37 in bracket 42 and carries a roller G38 which engages the ways of cam G39 on cam shaft 38. Since gear G34 is keyed to shaft G24 the described vertical movement of the shaft produced by lever G40 which engages collar G41 on said shaft is permitted. Lever G40 pivots about pin G42 in the table (not shown) and is operated through a roller G43 thereon which engages cam G44 on cam shaft 38. Further movement of the transfer mechanism consists in dropping and turning into the position shown in Fig. 12 in which stud G25 is against stop screw G45 of the arm G46 extending from bracket 42, at which position said mechanism was found at the start of this description.

The mount taken by the turret H is gripped between one of eight pairs of jaws mounted thereon. Each of said pairs of jaws consists of a stationary jaw H1 (Fig. 12) fastened to turret H2 and a movable jaw H3 comprising a laterally extending portion lying on a laterally extending portion of said stationary jaw, in ways in said turret. When the mount is inserted into the pair of jaws at position U these jaws are open since the high part of cam H5 rides behind roller H6 which is attached to the movable jaw by screw H7. The cam H5 is then turned so a low part is below the roller allowing the jaws to be closed by spring H8 which extends between a post H9 in the movable jaw and a post H10 in the retaining ring H11. The retaining ring is fastened to the turret and holds the movable turret jaws in the grooves or ways in the turret. Cam H5 is attached to sleeve H12 and is operated through said sleeve which is turned about shaft H13 by arm H14. As shown in Fig. 15, arm H14 is operated by cam H15 on cam shaft 38 through lever H16 which engages said cam through a roller H17 mounted thereon and is connected to arm H14 by link H18. Lever H16 turns about pin H19 in bracket E17 on which said pin is held by collar H20.

After having gripped a mount, the turret is indexed clockwise so that the jaws carrying the mount are advanced one position, after which repeated indexing occurs at intervals until the mount comes into position V, 180° from the loading position U. The turret H2 is attached to shaft H13 which is turned intermittently by ratchet wheel H21 attached to the lower end thereof. The ratchet wheel H21 is engaged by pawl H22 of lever H23 which is operated through engagement of the roller H24 on one end thereof with cam H25 on shaft 38. The pawl H22 operates about screw H26 in the end of the lever and is kept against the ratchet wheel by spring H27 stretched between said pawl and lever. The roller H24 is kept against the cam by spring H28 which extends between said lever and a stationary part of the machine. Shaft H13 turns freely in bracket 42 which supports said turret through ball bearing H29 (Fig. 12) on which said turret rests.

Means are provided for causing the turret to take a definite position after each indexing movement. Said means consist of the circular plate H30 having indentations therein at each of the respective positions which are engaged by the slug H31 below spring H32 in the aperture in turret H2.

The bulb, into which the mount is dropped from the turret H, initially entered this machine through the tube J1 of the bulb escapement mechanism J shown in Figs. 1, 12, 20, and 21. In this instance, apparatus (not shown) of the type disclosed in Patent 1,536,833 to Fagan et al., issued May 5, 1925, is used to feed miniature bulbs 45 in a neck-up position into tube J1. The lower end of the tube enters boss J2 which is supported by the bracket J3 extending from bracket 42 and which guides the bulbs down onto the bulb turret K. On entering boss J2 the bulbs come against finger J4 which is disposed in an aperture in boss J2 below the bracket and which extends from lever J5. The lever J5 pivots about screw J6 in bracket J3 and obstructs the path of travel of the bulbs while the jaws J7 and J8 below are open. The finger J4 is withdrawn when the jaws are closed since the passage is then closed off by the overlapping jaw ends J9 and J10 which operate in passages in the boss J2. The jaws J7 and J8 are pivoted on screws J11 and J12, respectively, in bracket J3 and are closed by spring J13 which is located between the outer ends of posts in said jaws extending through apertures in the bracket. Lever J5 is operated by a finger J14 hinged thereto which engages the spring post extending from jaw J8 against which it is held by spring J15. Spring J15 extends between a post in lever J5 and another post in bracket J3. Jaws J7 and J8 are provided with gear segments J16 and J17 respectively, and will receive the bulb as they are closed and the finger J4 is withdrawn. The reverse action will first segregate the bulb lying on the jaws, since the bulb adjacent thereto will be held by the finger J4, and then will permit the said segregated bulb to fall onto the bulb turret K as the jaw ends J9 and J10 are withdrawn. The mechanism is operated through arms J18 of jaw J7 which is attached by means of link J19 to lever J20 (Fig. 5) which is operated from cam J21 on shaft 40. Lever J20 pivots about shaft 39 and is turned by spring J22 extending between said lever and a stationary part of the machine so that roller J23 thereon is in engagement with cam J21.

Since the bulbs are fed intermittently and are of such light weight, they would often stick if they were not freed by the agitation caused by block J24 on lever J25 striking tube J1. Lever J25 turns about pin H19 in bracket E17 and engages through roller J26, cam J27. Spring J28 which extends between lever J25 and a stationary part of the machine causes the roller to be kept in engagement with the cam.

Figures 18, 19, 20, 21, 22, 23, 24:
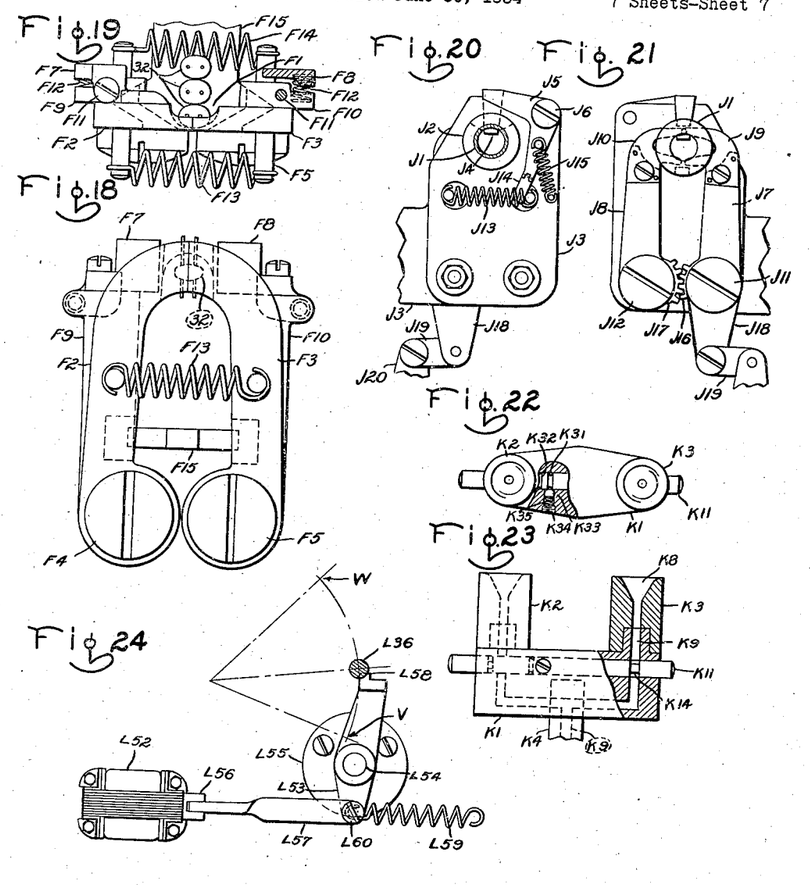
Figs. 18 and 19 are front and top views of the mount escapement jaws.
Figs. 20 and 21 are top and bottom views of the bulb escapement mechanism.
Figs. 22 and 23 are side and top views partially in section of the bulb turret.
Fig. 24 is a plan view of the bulb transfer arresting mechanism.

The bulb released by the escapement mechanism J falls onto a head of the bulb turret K which provides the means for transferring the bulb to an unobstructed position from which the bulb transfer mechanism L may take it. The bulb turret consists, as shown in Figs. 12, 22, and 23, of a body portion K1, which carries heads K2 and K3 and is mounted on the upper end of shaft K4. The shaft K4 is slidably mounted in sleeve K5 in ball bearings K6 and K7 on bracket 42. The bulb released from the escapement means drops onto the conical seat K8 in one head which communicates with a passage K9 in the head, body and shaft K4. As shown in Fig. 15 a vacuum source is connected to passage K9 by flexible hose K10 which is slipped over the lower end of shaft K4. When the bulb is dropped in the seat K8 the vacuum is caused to draw on the bulb by the shifting of valve pin K11 (Fig. 23). The pin is shifted by stud K12 (Fig. 15) in the end of lever K13 which strikes the end of the pin and moves it longitudinally bringing the reduced section K14 in alignment with passage K9. Lever K13 swings about shaft 39 and is actuated by cam K15 through roller K16. Spring K17 which extends between lever K13 and a stationary part of the machine keeps roller K16 against the cam.

After the bulb has been deposited upon the turret head, the said turret is lowered, turned through 180° and then raised again. This action places the other head in position to receive a bulb and places the bulb carrying head in position for the bulb transfer mechanism to take the bulb. The lowering motion results from movement of lever K18 (Fig. 15) which is moved about pin K19 in a stationary part of the machine (not shown) by rotation of cam K20 on shaft 38. Roller K21 on the lever engages the cam, and links K22 and collar K23 provide the connection to shaft K4. The rotary motion of the turret is provided by cam K24 (Fig. 15) through lever K25, gear K26 and gear segment K27. As shown in Fig. 12, gear K26 is fastened to sleeve K5 which is keyed to shaft K4 by screw K28 therein and, as shown in Fig. 15, is operated by the gear segment K27 in the end of lever K25. The lever K25 engages the cam K24 through roller K29 which is held thereagainst by spring K30 extending between posts in said lever and bracket 42. The operating procedure at the turret loading position results in the shifting of the valve pin K11 (Fig. 23), cutting off the suction to the exposed head since the pin moves so as to close off the passage thereto. The two positions of the valve pin K11 are designated by the reduced sections K31 and K32 thereof which are engaged by the ball K33 behind screw K34 and spring K35 in an aperture in the turret body K1.

The bulb transfer mechanism L carries the bulb and the mount which is placed therein to a head of the butt sealing machine. The transfer mechanism is shown in Figs. 1 and 12 and consists of a pair of jaws L1 and L2 pivotally mounted by screws L3 and L4 on arm L5. The mechanism swings clockwise from the position shown in Fig. 1 to a position adjacent the bulb, whereupon the jaws are closed thereabout by the rotation of cam L6. The cam is engaged by roller L7 of lever L8 which swings about screw L9 in arm L5 and operates jaw L1 through connecting link L10. Gear teeth in each jaw mesh with each other so the jaws move together. Spring L11 located between posts in lever L8 and arm L5 causes the roller L7 to engage the cam L6. Having gripped the bulb, the transfer mechanism is raised, bringing the bulb neck up around the mount in turret H at position V. The elevation is brought about by vertical movement of shaft L12, on which arm L5 is mounted, which is operated by lever L13 (Fig. 15) through engagement with collar L14 on the end of said shaft. Lever L13 turns about a pin L15 in a stationary part of the machine (not shown) and is operated by a roller also not shown in the ways L16 of cam L17 on shaft 38. The arm L5 is kept from slipping vertically on shaft L12 by collar L18 (Fig. 12) and cam L6 which are fastened to said shaft which is supported by sleeve L19 in ball bearings L21 and L22 in bracket 42.

The mount is released from the turret and falls into the bulb with the outwardly extending portions of the leading-in wires slipped between guides (not shown) attached to the transfer jaws which keep the mount from turning. The transfer mechanism now swings to a position over the head 49 of the butt sealing machine and drops down until the bulb rests thereon. The turning results from a counter-clockwise turning of shaft L12 which the arm L5 follows because of the friction producing bearing cap L23 which is located below leaf spring L24 on screws L25. The turning is produced in shaft L12 by sleeve L19 which is engaged by pin L26 therein and which is turned by the lever L27 (Fig. 15) through gear segment L28 and gear L29. Lever L27 turns about a pin L30 in a stationary part of the machine (not shown) and connects through link L31 to lever L32 which engages through roller L33 the ways of cam L34 on shaft 38 and which turns about pin L35 in a stationary part of the machine (not shown). Further rotation of shaft L12 after the lamp rests in the sealing machine head results in the separate rotation of cam L6, thereby opening the jaws L1 and L2 since stud L36 (Fig. 12) is in contact with arm L37 of collar L38. Another arm at the other position of the transfer mechanism stops rotation thereof and causes the jaws to close. Collar L38 is clamped to a boss on bracket 42.

Since the failure of mount to be fed cancels the need for a bulb, automatic mechanism is provided for stopping the feeding thereof. This mechanism consists of means for detecting the absence of a mount in the unloading position V of the turret H and mechanism for stopping the bulb transfer mechanism L. The mount detecting mechanism consists of an electrical switch L39 (Figs. 1 and 12) having an insulating body portion L40 mounted on bar L41 extending from bracket 42 and supporting stationary contact arm L43 and movable contact lever L44. The movable lever L44 pivots about screw L45 and has an arm L46 extending therefrom which engages cam L47 on post H9 of the movable jaw of the turret at position V. The cam L47 of each head of the turret is set so that the absence of a mount in the jaws moves lever L44 bringing the contacts together. The switch, as shown in Fig. 17, is connected in a circuit comprising a battery E33 and coil L48 of relay L49. Closing of the battery circuit causes the armature L50 to be pulled into contact with contact L51 closing a circuit of higher potential through solenoid L52. The solenoid L52 shown in Fig. 24 is mounted on the table of the machine adjacent the path of travel of the bulb transfer mechanism which is indicated. With the solenoid in operation, lever L53 takes the position shown, thereby stopping the transfer mechanism before it reaches the pick-up position. The lever L53 turns about pin L54 in standard L55 and is connected to the armature L56 of the solenoid by link L57. The tooth L58 in the end of lever L53 engages a shoulder in stud L36 and prevents the lever from turning counter-clockwise until the stud has moved away therefrom. The return of this mechanism is produced by spring L59 which extends between pin L60 connecting link L57 and lever L53 and a post (not shown) in bracket 42. Mechanism heretofore described which has been operated from cam shaft 38 operates in proper time relation to the butt sealing machine because said cam shaft 38 (Fig. 15) is driven therefrom by means of the chain 47 which meshes with gear 48 thereon.

The butt sealing machine M is of the type disclosed in Patent No. 1,742,153, Stiles et al., issued December 31, 1929, hereinbefore referred to, and holds the bulbs by vacuum on head 49 and grips the outwardly extending ends of the leading-in wires between oppositely disposed pairs of jaws 50 and 51. A tube 52 held by another pair of jaws 53 and 54 (Figs. 1 and 12) is sealed to the neck of the bulb with portions of leading-in wires enclosed in the joint during its course of operations. The finished product is held by the head in position X.

The bulb assembly is taken from the sealing machine head at position X by the transfer mechanism N to the conveyor chain O. The transfer mechanism consists, as shown in Figs. 25 and 26, of a stationary jaw N1 mounted on a slide N2, and a pair of movable jaws N3 and N4 on either side of said stationary jaw which pivot on bolt N5 therein. Slide N2 is supported in ways in bracket N6 in which it is held by plates N7 and N8 attached thereto, said bracket being horizontally mounted on the vertical tube N9 through an arm not shown. The tube N9 also supports bracket N10 which is connected to bracket N6 by shaft N11 which turns freely in both parts. When the sealing machine M is indexed the movable jaws N3 and N4 are drawn farther away from the stationary jaw N1 than shown by the engagement of roller N13 on bolt N14 in said jaws with the thicker end portion of slide cam N15. Spring N16, located between a bolt in slide N2 and bolt N14, draws the roller N13 against the slide cam N15. The said slide cam rides in ways in slide N2.

The sealing machine index carries the exhaust tube of the bulb assembly between the jaws N1 and N3, N4 which are closed thereon by a counter-clockwise rotation of shaft N11. This action occurs when arm N17 of hub N18 on the shaft comes in contact with stud N19 in the slide cam N15 and moves it forward, thereby withdrawing roller N13 from the high part of the cam. In the forward position, the screw in stud N20 is against stud N21. The hub N18 is driven by gear N22 which is attached thereto and is driven by the rack N23 in mesh therewith. The rack rides in ways in bracket N10 and is held in engagement with the gear by roller N24 on bolt N25 in the bracket. The rack is operated through rod N26 (Fig. 1) from mechanism which is not shown. After the exhaust tube is gripped, a clockwise rotation occurs in shaft N11 which results in a reciprocating motion of slide N2, thereby transferring the tube to a pair of clips O1 and O2 on the conveyor O. Shaft N11 moves the slide N2 through gear N27 which is in mesh with the rack N28 cut in the slide. Gear N27 is driven by means of a friction producing bearing cap N29 below leaf spring N30. The movement is terminated when stop screw N31 on slide N2 strikes bracket N6. The continued rotation of shaft N11 opens the jaws N1 and N3, N4 by bringing arm N32 against stud N19, thereby shifting the slide cam N15 and bringing the high part of said cam below roller N13. The conveyor O carries the bulb assembly away, whereupon a counter-clockwise rotation occurs in the shaft N11, which moves slide N2 toward the sealing machine M and, after a bulb assembly is located therein, closes the jaws. In this position of the slide, screw N33 on the end thereof is against the bracket N6.

The conveyor O consists of a chain O3 (Fig. 27) which carries a number of pairs of spring clips O1 and O2 and rests O4 disposed below said clips on brackets O5. The chain rides on sprockets O6 and O7 which cause the chain to be indexed one position at a time at intervals.

The bulb assembly placed in the conveyor by the transfer mechanism finally indexes into position Y from which it is taken by the transfer mechanism P and placed in the exhaust machine Q. The said transfer mechanism P, shown in Fig. 28, consists of a stationary jaw P1 mounted on arm P2 and a movable jaw P3 pivotally mounted on screw P4 in the stationary jaw. Arm P2 is mounted on rod P5 which it frictionally engages. At the positions Y, Z of the mechanism, one or the other of the stop screws P6, P7 is against the stationary post P8. The movable jaw P3 is operated by cam P9 on the end of rod P5 which engages roller P10 on lever P11 and turns said lever about pin P12 in arm P2. Link P13 connects lever P11 and the movable jaw P3, and spring P14, which is extended between posts in lever P11 and arm P2, keeps roller P10 against cam P9. The parts of the exhaust machine Q face downward so the transfer mechanism after swinging under one of said parts, is raised, thereby pushing the exhaust tube of the bulb assembly into the exhaust port. The exhaust machine either exhausts or gas fills the bulb assembly and then tips off the exhaust tube so that the finished product of this unit machine of our invention is a lamp consisting of a bulb enclosure with filament therein and leading-in wires extending therefrom.

What we claim as new and desire to secure by Letters Patent of the United States is:

1. A unitary and completely automatic machine for making incandescent lamps comprising a mount making machine for manufacturing mounts comprising two lead wires having juxtaposed portions which are held together and support a filament at their inner ends, the outer ends of said lead wires extending transversely to the said juxtaposed portions, transfer mechanism adjacent said mount making machine for transferring a mount directly from said mount making machine and disposing it in a glass bulb which is disposed in a neck-up position, a machine for butt-sealing a glass exhaust tube to the neck of said bulb and enclosing portions of the lead wires in the joint, a machine for exhausting said bulb and tipping off said exhaust tube, mechanism for transferring said bulbs having the mounts sealed therein from said butt sealing machine to said exhausting machine, and means for causing said mechanisms to operate in proper time relation.

2. A unitary and completely automatic machine for making incandescent lamps comprising a mount making machine for manufacturing mounts comprising two lead wires having juxtaposed portions which are held together and support a filament at their inner ends, the outer ends of said lead wires extending transversely to the said juxtaposed portions, a storage chute, mechanism for transferring said mounts from said mount making machine to said storage chute, a sealing machine for sealing said mounts in glass bulbs, mechanism for transferring said mounts one at a time from said storage chute to said sealing machine, and means for causing said mechanisms to operate in proper time relation.

3. A unitary and completely automatic machine for making incandescent lamps comprising a mount making machine for manufacturing mounts comprising two lead wires having juxtaposed portions which are held together and support a filament at their inner ends, the outer ends of said lead wires extending transversely to the said juxtaposed portions, a plurality of storage chutes, mechanism for transferring said mounts from said mount making machine to said storage chutes, a sealing machine for sealing said mounts in a glass bulb, mechanism for transferring said chutes to an unloading position, mechanism adjacent said unloading position for transferring said mounts one at a time from said storage chutes to said sealing machine, and means for causing said mechanism to operate in proper time relation.

4. A unitary and completely automatic machine for making incandescent lamps comprising a mount making machine for manufacturing mounts comprising two lead wires having juxtaposed portions which are held together by a glass bead and support a filament at their inner ends, the outer ends of said lead wires extending transversely to the said juxtaposed portions, a storage chute, mechanism for transferring said mounts from said mount making machine to said storage chute, mechanism for transferring said chute to an unloading position, mount escapement mechanism located at said unloading position adjacent the end of said chute and engaging with the glass bead portions of said mounts for separating a mount at the end of said chute from the remaining mounts, a sealing machine for sealing said mounts in glass bulbs, mechanism for transferring said mounts one at a time from said storage chute to said sealing machine, and means for causing said mechanisms to operate in proper time relation.

5. In a machine of the class described, a transfer mechanism for mounts comprising two lead wires having juxtaposed portions which are held together and support a filament at their inner ends, the outer ends of said lead wires extending transversely to said juxtaposed portions, said transfer mechanism comprising a chute having a pair of parallel rails and a third guide rail parallel to said pair of rails and located midway therebetween, mechanism located at a loading position of said chute for disposing a plurality of mounts thereon in an inverted position with the transverse outer ends of the lead wires on said pair of rails and the juxtaposed portions of said wires on either side of said guide rail, mechanism located at an unloading position of said chute for separating a mount at the end of the chute from the remaining mounts, mechanism for removing said separated mounts one at a time from said unloading position, and means for causing said mechanisms to operate in proper time relation.

6. In a machine of the class described, a transfer mechanism for mounts comprising two lead wires having juxtaposed portions which are held together and support a filament at their inner ends, the outer ends of said lead wires extending transversely to said juxtaposed portions, said transfer mechanism comprising a plurality of radially disposed chutes each having a pair of parallel rails, said chutes being pivotally mounted on a vertical shaft, mechanism for rotating said chutes successively into a loading position and an unloading position, mechanism located at said loading position for disposing a plurality of mounts one at a time on a chute with the transverse outer ends thereof riding on the said rails of said chute, mechanism at said unloading position for removing said mounts one at a time from said chute, and means for causing said mechanisms to operate in proper time relation.

7. In a machine of the class described, a transfer mechanism for mounts comprising two lead wires having juxtaposed portions which are held together and support a filament at their inner ends, the outer ends of said lead wires extending transversely to said juxtaposed portions, said transfer mechanism comprising a plurality of radially disposed chutes each having a pair of parallel rails, said chutes being pivotally mounted on a vertical shaft, mechanism for rotating said chutes successively into a loading position and an unloading position, mechanism for tilting the outer ends of said chutes up at the loading position and down at the unloading position, mechanism located at said loading position for disposing a plurality of mounts on a chute with the transverse outer ends thereof riding on the said rails of said chute, mechanism at said unloading position for removing said mounts one at a time from said chutes, and means for causing said mechanisms to operate in proper time relation.

8. In a machine of the class described for transferring mounts comprising two lead wires having juxtaposed portions which are held together and support a filament at their inner ends, the outer ends of said lead wires extending transversely to said juxtaposed portions, a storage chute having a plurality of mounts disposed therein, mechanism for transferring said chute to an unloading position, mount escapement mechanism located at said unloading position adjacent the end of said chute for separating a mount at the end of said chute from the remaining mount, a horizontally disposed mount turret having a plurality of jaws at the periphery thereof, a pair of transfer jaws, mechanism for causing said transfer jaws to grip a separated mount at the end of said storage chute and deliver it to a pair of jaws on said turret, a bulb turret comprising a plurality of heads having bulbs disposed therein in a neck-up position, mechanism for rotating said mount turret to cause a pair of jaws thereon to register with a bulb on said bulb turret and to cause said jaws to be opened to deposit the mount gripped thereby in said bulb, a pair of transfer jaws, mechanism for causing said jaws to grip a bulb on said bulb turret and deliver it to a sealing machine, and means for causing said mechanism to operate in proper time relation.

9. In a machine for making incandescent lamps, transfer mechanism for mounts comprising two lead wires having juxtaposed portions which are held together by a glass bead and support a filament at their inner ends, the outer ends of said lead wires extending transversely to the said juxtaposed portions, a storage chute, a pair of vertically disposed jaws mounted on the end of a horizontally disposed arm for transferring said mounts from a mount making machine to said storage chute, mechanism for causing said jaws to grip a mount on said mount making machine and then swing toward said chute and turn in a vertical plane through substantially 180 degrees to deposit said mount on said chute in an inverted position, mechanism for transferring said chute to an unloading position, mount escapement mechanism located at said unloading position adjacent the end of said chute and engaging with the glass bead portions of said mounts for separating a mount at the end of said chute from the remaining mounts, mechanism for transferring said mounts one at a time from said storage chute to a sealing machine, and means for causing said mechanisms to operate in proper time relation.

10. In a machine of the class described, a transfer mechanism for mounts comprising two lead wires having juxtaposed portions which are held together and support a filament at their inner ends, the outer ends of said lead wires extending transversely to said juxtaposed portions, said transfer mechanism comprising a plurality of radially disposed chutes each having a pair of parallel rails, said chutes being pivotally mounted on a vertical shaft, mechanism for rotating said chutes successively into a loading position and an unloading position, mechanism located at said loading position for disposing a plurality of mounts one at a time on a chute with the transverse outer ends thereof riding on said rails of said chute, mechanism for recording the number of mounts deposited on a chute at said loading position and for indexing said chute when the proper number of mounts have been deposited thereon, mechanism at said unloading position for removing said mounts one at a time from said chute, and means for causing said mechanisms to operate in proper time relation.

11. In a machine of the class described, a transfer mechanism for mounts comprising two lead wires having juxtaposed portions which are held together and support a filament at their inner ends, the outer ends of said lead wires extending transversely to said juxtaposed portions, said transfer mechanism comprising a plurality of radially disposed chutes each having a pair of parallel rails, said chutes being pivotally mounted on a vertical shaft, mechanism for rotating said chutes successively into a loading position and an unloading position, mechanism located at said loading position for disposing a plurality of mounts one at a time on a chute with the transverse outer ends thereof riding on said rails of said chute, mechanism for recording the number of mounts deposited on a chute at said unloading position comprising a ratchet wheel having a plurality of notches in the periphery thereof corresponding to the number of mounts to be deposited on the chute, a pawl engaging said notches, mechanism for actuating said pawl to rotate said ratchet wheel the distance between successive notches each time a mount is deposited on the said chute, and cam mechanism for causing said chute to be indexed away from said loading position upon completion of a revolution of said ratchet wheel, mechanism at said unloading position for removing said mounts one at a time from said chute, and means for causing said mechanisms to operate in proper time relation.

12. In a device of the class described, the combination of a storage means, mount feeding mechanism for depositing mounts one at a time in said storage means and mechanism for recording the number of mounts deposited in said storage means comprising a ratchet wheel having a plurality of notches in the periphery thereof corresponding to the number of mounts to be deposited in said storage means, a pawl engaging said notches, mechanism for actuating said pawl to rotate said ratchet wheel the distance between successive notches each time a mount is deposited in said storage means, and cam mechanism for causing the feeding to said storage means to be interrupted upon completion of a revolution of said ratchet wheel.

13. In a device of the class described, the combination of a storage means, mount feeding mechanism for depositing mounts one at a time in said storage means and mechanism for recording the number of mounts deposited in said storage means comprising a ratchet wheel having a plurality of notches in the periphery thereof corresponding to the number of mounts to be deposited in said storage means, a pawl engaging said notches, mechanism for actuating said pawl to rotate said ratchet wheel the distance between successive notches each time a mount is deposited in said storage means, testing means comprising an electrical circuit including said mount and a relay whereby when said mount is defective and no current passes therethrough the said mount feeding mechanism is rendered inoperative and the said pawl is displaced from said ratchet wheel to prevent rotation thereof, and cam mechanism for causing the feeding to said storage means to be interrupted upon completion of a revolution of said ratchet wheel.

14. In a machine of the class described, a transfer mechanism for mounts comprising two lead wires having juxtaposed portions which are held together and support a filament at their inner ends, the outer ends of said lead wire extending transversely to said juxtaposed portions, said transfer mechanism comprising a plurality of radially disposed chutes each having a pair of parallel rails, said chutes being pivotally mounted on a vertical shaft, mechanism for rotating said chutes successively into a loading position and an unloading position, transfer mechanism located at said loading position for disposing a plurality of mounts one at a time on a chute with the transverse outer ends thereof riding on said rails of said chute, a stationary chute at said unloading position with which said radially disposed chutes register successively to form a continuation thereof, a feeler disposed adjacent said stationary chute and engaged by the mounts as they slide down, mechanism actuated by said feeler for indexing a radially disposed chute away from said unloading position when the last mount on said chute has passed under said feeler, mechanism at said unloading position for removing said mounts one at a time from said chute, and means for causing said mechanism to operate in proper time relation.

15. A unitary and completely automatic machine for making incandescent lamps comprising a mount making machine for manufacturing mounts comprising two lead wires having juxtaposed portions which are held together and support a filament at their inner ends, the outer ends of said lead wires extending transversely to the said juxtaposed portions, a bulb turret comprising a plurality of heads, mechanism for feeding bulbs to the heads of said turrets one at a time in a neck-up position, mount transfer mechanism for transferring the mounts from said mount making machine and depositing them in the bulbs in said turret heads, a sealing machine for sealing glass tubes to the necks of said bulbs and enclosing portions of the lead wires of the mount in the joint, transfer mechanism for transferring bulbs having mounts disposed therein from said turret heads to said sealing machine; and means for causing said mechanisms to operate in proper time relation.

16. In a device of the class described, a bulb turret comprising a plurality of heads, mechanism for feeding bulbs to the heads of said turret one at a time in a neck-up position, mount feeding mechanism comprising a horizontally disposed turret having a plurality of jaws at the periphery thereof which grip a mount having outwardly extending lead wire portions, mechanism for raising said bulb turret to bring one of the heads thereof below a pair of jaws in said mount feed turret, mechanism for opening said jaws to allow a mount to drop in said bulb with the outwardly extending lead wire portions lying on said bulb neck, mechanism for transferring the bulbs having the mounts disposed therein from said bulb turret heads to a sealing machine, and means for causing said mechanisms to operate in proper time relation.

JOHN F. DONOVAN.
GEORGE ILLINGWORTH.